(12) United States Patent
Zhu et al.

(10) Patent No.: US 9,231,723 B2
(45) Date of Patent: Jan. 5, 2016

(54) COORDINATED DYNAMIC POINT SELECTION (DPS) WITH CELL RANGE EXPANSION IN A COORDINATED MULTIPOINT (COMP) SYSTEM

(71) Applicant: Intel Corporation, Santa Clara, CA (US)

(72) Inventors: Yuan Zhu, Beijing (CN); Alexei Davydov, Nizhny Novgorod (RU); Gregory V. Morozov, Nizhny Novgorod (RU); Debdeep Chatterjee, Santa Clara, CA (US); Xiaogang Chen, Beijing (CN); Qinghua Li, San Ramon, CA (US); Huaning Niu, Milpitas, CA (US); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 91 days.

(21) Appl. No.: 13/725,370

(22) Filed: Dec. 21, 2012

(65) Prior Publication Data

US 2013/0303167 A1    Nov. 14, 2013

Related U.S. Application Data

(60) Provisional application No. 61/646,223, filed on May 11, 2012.

(51) Int. Cl.
*H04J 3/26* (2006.01)
*H04B 7/26* (2006.01)
(Continued)

(52) U.S. Cl.
CPC ... *H04J 3/26* (2013.01); *H04B 1/56* (2013.01); *H04B 7/024* (2013.01); *H04B 7/0456* (2013.01); *H04B 7/0473* (2013.01); *H04B 7/0486* (2013.01); *H04B 7/063* (2013.01);
(Continued)

(58) Field of Classification Search
CPC ... H04W 24/10; H04W 72/042; H04W 36/22; H04W 36/00; H04W 36/04
See application file for complete search history.

(56) References Cited

U.S. PATENT DOCUMENTS 8,767,581 B2 * 7/2014 Yamada ............... H04W 24/00 370/252
8,914,028 B2 * 12/2014 Gayde et al. .......... H04W 48/06 455/436

(Continued)

FOREIGN PATENT DOCUMENTS

WO     2013/170127 A1    11/2013

OTHER PUBLICATIONS

International Search Report and Written Opinion received for PCT Patent Application No. PCT/US2013/040509, mailed on Aug. 21, 2013, 11 pages.

(Continued)

*Primary Examiner* — Liton Miah
(74) *Attorney, Agent, or Firm* — Thorpe North & Western

(57) ABSTRACT

Technology for mitigating edge effect interference in a Coordinated MultiPoint (CoMP) system having multiple CoMP clusters is disclosed. In an example, a method can include a macro node transmitting a cell range expansion request to user equipments (UEs) within a cell. A CoMP cluster for nodes within the cell that includes UEs operating with the cell range expansion can be generated. Blanked resources between a plurality of macro nodes for the CoMP clusters in the CoMP system can be coordinated using a muting preference including a blanked resource.

18 Claims, 11 Drawing Sheets

(51) Int. Cl.

| | |
|---|---|
| H04W 36/00 | (2009.01) |
| H04J 3/16 | (2006.01) |
| H04W 24/10 | (2009.01) |
| H04W 72/04 | (2009.01) |
| H04W 72/08 | (2009.01) |
| H04J 3/00 | (2006.01) |
| H04B 1/56 | (2006.01) |
| H04W 56/00 | (2009.01) |
| H04W 52/02 | (2009.01) |
| H04W 76/02 | (2009.01) |
| H04W 4/22 | (2009.01) |
| H04W 36/22 | (2009.01) |
| H04B 15/00 | (2006.01) |
| H04W 76/04 | (2009.01) |
| H04B 7/02 | (2006.01) |
| H04B 7/04 | (2006.01) |
| H04B 7/06 | (2006.01) |
| H04W 24/02 | (2009.01) |
| H04W 72/12 | (2009.01) |
| H04L 29/02 | (2006.01) |
| H04W 4/00 | (2009.01) |
| H04W 4/06 | (2009.01) |
| H04W 48/20 | (2009.01) |
| H04L 29/06 | (2006.01) |
| H04W 4/02 | (2009.01) |
| H04L 27/26 | (2006.01) |
| H04W 72/10 | (2009.01) |
| H04W 36/30 | (2009.01) |
| H04W 36/18 | (2009.01) |
| H04W 88/06 | (2009.01) |
| H04W 72/02 | (2009.01) |
| H04W 16/14 | (2009.01) |

(52) U.S. Cl.
CPC ............ *H04B 7/065* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/1694* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/22* (2013.01); *H04W 24/02* (2013.01); *H04W 24/10* (2013.01); *H04W 36/00* (2013.01); *H04W 36/0061* (2013.01); *H04W 36/22* (2013.01); *H04W 48/20* (2013.01); *H04W 52/0212* (2013.01); *H04W 52/0225* (2013.01); *H04W 52/0235* (2013.01); *H04W 56/00* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01); *H04W 76/023* (2013.01); *H04W 76/027* (2013.01); *H04W 76/048* (2013.01); *H04W 16/14* (2013.01); *H04W 36/18* (2013.01); *H04W 36/30* (2013.01); *H04W 72/02* (2013.01); *H04W 88/06* (2013.01); *Y02B 60/50* (2013.01)

(56) References Cited

U.S. PATENT DOCUMENTS

| | | | |
|---|---|---|---|
| 2011/0034175 A1* | 2/2011 | Fong et al. | 455/450 |
| 2011/0275394 A1 | 11/2011 | Song et al. | |
| 2012/0083280 A1 | 4/2012 | Liu et al. | |
| 2012/0113850 A1 | 5/2012 | Fu et al. | |
| 2012/0282864 A1* | 11/2012 | Dimou et al. | 455/67.14 |
| 2013/0148515 A1* | 6/2013 | Ribeiro et al. | H04L 5/0094 370/252 |
| 2013/0170474 A1* | 7/2013 | Bi et al. | 370/332 |
| 2014/0226575 A1* | 8/2014 | Davydov et al. | 370/329 |

OTHER PUBLICATIONS

Barbieri et al. "Coordinated Downlink Multi-Point Communications in Heterogeneous Cellular Networks" In: Information Theory and Applications Workshop (ITA), 2012, San Diego: ITA, Feb. 5-10, 2012, 11 Pages.

China Unicom "Discussion on the possible scenarios to implement CRE with large bias" R1-114200, 3GPP TSG-RAN WG1 Meeting #67, San Francisco, USA, Nov. 14-18, 2011, 2 pages.

Evolved Universal Terrestrial Radio Access Network (E-UTRAN); X2 application protocol (X2AP)(Release 10), 3GPP TS 36.423 V10.4.0, 132 pages.

Davydov et al., "Association Biasing for a Heterogeneous Network (HetNet)", Russian patent application No. 2011154105 filed on Dec. 28, 2011, 25 Pages.

Davydov et al., "Rescheduling of a Resource Component of Low Power Nodes (LPNs) in a Coordination Set", PCT patent application No. PCT/US2012/037715 filed on May 14, 2012, 31 Pages.

* cited by examiner

COORDINATED DYNAMIC POINT SELECTION (DPS) WITH CELL RANGE EXPANSION IN A COORDINATED MULTIPOINT (COMP) SYSTEM

RELATED APPLICATIONS

This application claims the benefit of and hereby incorporates by reference U.S. Provisional Patent Application Ser. No. 61/646,223, filed May 11, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
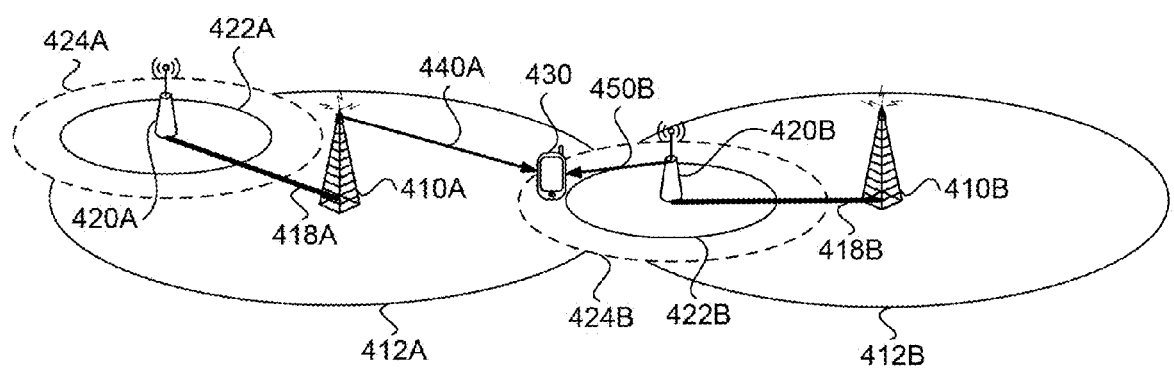
FIG. 1 illustrates a diagram of a heterogeneous network (HetNet) including a plurality of coordinated multipoint (CoMP) clusters each with a macro node and a low power node (LPN) using cell range expansion (CRE) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Heterogeneous networks (HetNets) can be used to handle increased traffic demands from wireless data traffic. The low power nodes (LPNs) can be deployed in the macro cell (e.g., macro node coverage area) to offload the traffic from macro node to LPNs. Where macro nodes and LPNs may use the same frequency bandwidth, different techniques (e.g., LTE-Advanced systems and process) can be used to improve the spectrum efficiency. Spectral efficiency (SE), spectrum efficiency, or bandwidth efficiency refers to the information rate that can be transmitted over a given bandwidth in a specific communication system. SE can be a measure of how efficiently a limited frequency spectrum is utilized by a physical layer protocol, and sometimes by a media access control (a channel access protocol).

One of the techniques to improve the spectrum efficiency can be enhanced inter-cell interference coordination (eICIC). A network can support frequency domain inter-cell interference coordination (ICIC) or time domain enhanced ICIC (eICIC). In an example, ICIC can be used to decrease interference between neighboring cells or nodes by lowering the power of a part of the subchannels in the frequency domain which then can be received close to the node. The subchannels do not interfere with the same subchannels used in neighboring cells and thus, data can be sent to wireless devices that are close to the cell with less interference on these subchannels.

Enhanced ICIC (eICIC) is another ICIC technique used in the time domain for heterogeneous networks (HetNets), where a high power macro cell can be complemented with low power nodes such as pico cells (hotspots in shopping centers or at airports) or femto cells (hotspots in small areas such as homes or businesses). The low power nodes can exist inside a macro cell coverage area. The macro cell can transmit long range high power signals, and the low power nodes can transmit low power signals over short distances. In an example to mitigate interference between the macro cell and the several low power nodes located within the macro cell coverage area, eICIC can coordinate the blanking of subframes in the time domain in the macro cell by using almost blank subframes. As used herein, a cell can refer to the node (e.g., eNB) configured to communicate with wireless devices within a geographic region that is referred to as a cell coverage area. As used herein, a pico cell can refer to any lower power node or the cell coverage area of the LPN.

Enhanced ICIC can be used to increase LPN's coverage using cell range expansion (CRE) by applying a bias value on LPN's measured reference signal received power (RSRP) when making a cell association decision. Then some of the macro UEs can be offloaded to the pico cells.

For example, FIG. 1 illustrates a heterogeneous network (HetNet) with a first high power macro node 410A (or macro-eNB) with a first backhaul communication link 418A with a first lower power node 420A (micro-eNBs, pico-eNBs, femto-eNBs, home eNBs [HeNBs], remote radio head [RRH], or relay node). The HetNet can include a second high power macro node 410B (or macro-eNB) with a second backhaul communication link 418B with a second lower power node 420B (micro-eNBs, pico-eNBs, femto-eNBs, home eNBs [HeNBs], remote radio head [RRH], or relay node). The backhaul communication link can be a wired, wireless, or optical fiber connection. The backhaul communication link may use X2 signaling. The backhaul communication link can be used to apply interference mitigation or signal coordination between the macro node and the LPNs in a coordination set. HetNets can be used to optimize performance particularly for unequal user or traffic distribution and improve spectral efficiency per unit area of a cell. HetNets can also achieve significantly improved overall capacity and cell-edge performance.

The HetNet (and homogeneous network) can include regular (planned) placement of macro nodes 410A and 410B that can typically transmit at high power level, for example, approximately 5 watts (W) to 40 W, to cover the macro cell 412A and 412B. The HetNet can be overlaid with low power nodes (LPNs) 420A and 420B, which may transmit at substantially lower power levels, such as approximately 100 milliwatts (mW) to 2 W.

A LPN 420A or 420B can have a standard cell range 422A or 422B (or inner cell range) or a cell range expansion 424A or 424B (or cell range extension, edge cell range, or cell-edge range). Due to the closer proximity of the wireless device to the LPN, the wireless device within the standard cell range of the LPN may experience less interference from the macro node and other sources than a wireless device within the cell range extension but outside the standard cell range. The standard cell coverage or range (or center cell range) can represent an area in space (a geographic area) near the transmitting station where the transmission power and signal can be strong and a co-channel interference can be minimal. A cell range expansion (CRE) can be area near to the boundary of the cell where the transmission power and signal is weaker than a signal in the standard cell and the co-channel interference can be more significant. In an example, the first macro node 410A can generate a cell range expansion in the first LPN 420A and the second LPN node by requesting that wireless devices within the first macro node's coverage area perform biasing, such as RS biasing.

The cell range expansion of LPNs can be due to RS biasing requested by the macro nodes. RS biasing can apply an offset to the RS measurements allowing a LPN with a signal strength weaker than the macro node to associate with the wireless device. In an example, the RS biasing can have a range greater than 0 dB to about 6 dB. In another example, the RS biasing can have a range greater than 0 dB to about 16 dB.

Association (or handover) biasing can be an effective means to achieve the load balancing in non-uniform heterogeneous network deployments. The load balancing can be provided by coverage (or range) expansion at LPNs (low transmission power nodes). The range expansion can be virtually achieved by biasing of the wireless device association metric for LPNs by some value which may be signaled from the macro node to the wireless device via higher layers, such as radio resource control (RRC) signaling. The wireless device association metric can include a reference signal received power (RSRP) or a reference signal received quality (RSRQ). The load balancing can introduce severe interference conditions for wireless devices located in the range expansion zone. In order to provide reasonable throughput performance for such wireless devices, interference mitigation schemes, such as DL eICIC or coordinated multipoint (CoMP) transmission, can be applied at the macro node (e.g., an overlay high transmission power node or aggressor node).

The association can refer to the wireless device's direct wireless communication with a node, either a macro node or LPN. A re-association can include transferring a wireless device's direct wireless communication from one node to another node. The both nodes in the re-association may be within a coordination set, such as a CoMP cluster, or the nodes in the re-association may be in different coordination sets (e.g., CoMP cluster). A handover can refer to a transfer of the wireless device's direct wireless communication from a first node in a first coordination set to a second node in a second coordination set.

In an example, association biasing may not account for interference mitigation scheme parameters, such as a CoMP cluster. In particular, association biasing applied at the wireless device for LPNs regardless of the CoMP cluster that the LPNs belong to can reduce the effectiveness of the interference mitigation, such as DL eICIC or CoMP transmission. The coordination set (or CoMP cluster) can be defined as a set of nodes connected with each other via backhaul link and performing coordinated transmissions.

FIG. 1 illustrates association biasing being applied at the wireless device 430 to the second LPN 420B in a second coordination set, where the wireless device is associated (and in direction communication 440A) with the first macro node 410A in a first coordination set. The wireless device may receive a first macro node transmission 440A from the first macro node and a second LPN transmission 450B from the second LPN. In the example illustrated in FIG. 1, the first LPN 420A is in the first coordination set with the first macro node, and the second LPN is in the second coordination set with the second macro node 420B. The two coordination sets (or CoMP clusters) can generate independent transmissions, perform independent coordination, and/or perform independent interference mitigation from each other. In the example, the wireless device may be originally located in the coverage area of the first macro node, which can indicate that the wireless device receives the strongest power from the first macro node. After applying a range expansion, via association biasing, such as RS biasing, the wireless device can reside in the range expansion zone of the second LPN, which can belong to the another coordination set, such as the second coordination set. Interference mitigation for the wireless device may be performed for the second coordination set, while the interference suppression from the strongest interferer (the first macro node) may not be achieved, due to independent coordination decision at the first coordination set and the second coordination set.

In some cases, association biasing, and hence range expansion of LPNs, may be applied to LPNs within the macro node's coordination set without applying association biasing to LPNs outside the macro node's coordination set to maintain an improved performance of the wireless devices after the re-association with the LPNs.

Figure 2:
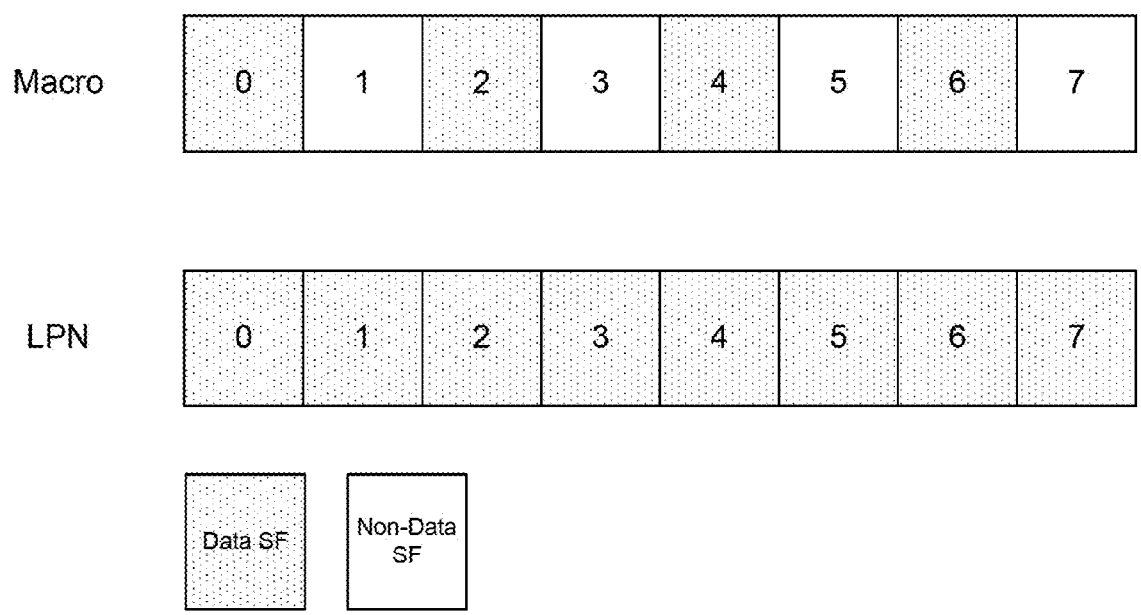
FIG. 2 illustrates a diagram of muted macro node subframes in a time domain enhanced inter-cell interference coordination (eICIC) in accordance with an example.

Additionally in order to allow pico cell to serve offloaded macro UEs (including macro UEs offloaded due to CRE) without experiencing harsh interference from the macro cell, macro cells can mute or blank the transmission some of the physical resources, such as subframes. FIG. 2 illustrates muting or blanking some of the subframes of the macro cell during the LPN subframes, such as a wireless devices operating outside the standard cell coverage area but within a CRE coverage area. For example, subframes 1, 3, 5, or 7 (approximately half of the subframes) at the macro node (or in the macro cells) can be muted. The data transmissions (e.g., data subframes [sf]) by the LPN during the muted subframes (e.g., non-data subframe) of the macro node can be received by the LPN's UEs with less interference than data transmissions by the LPN during subframes with macro node transmissions (e.g., subframes 2, 4, or 6).

Figure 3:
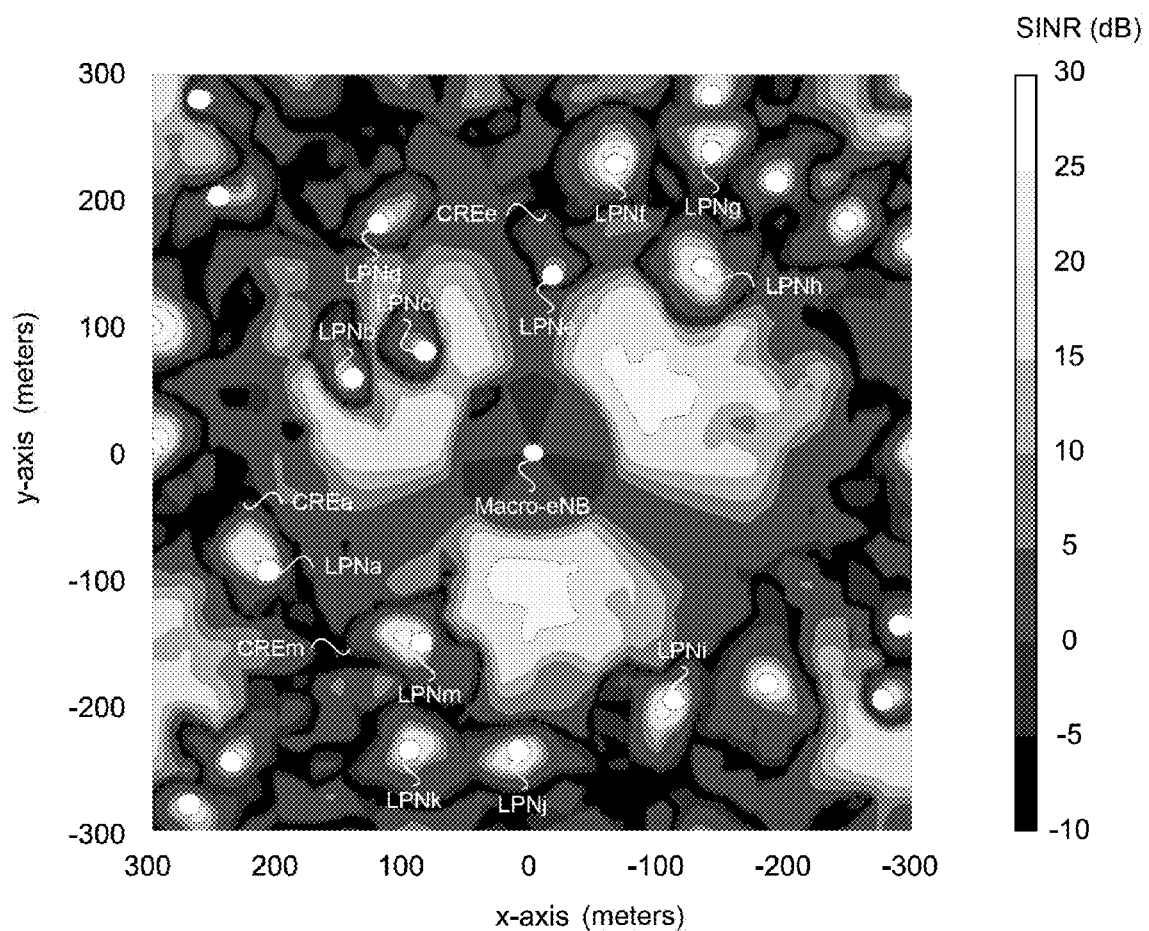
FIG. 3 illustrates a diagram of a geometry of a signal-to-noise-and-interference ratio (SINR) distribution for three macro cells in a heterogeneous network (HetNet) with each macro cell using pico cells in accordance with an example.

FIG. 3 illustrates a geometry signal-to-noise-and-interference ratio (SINR) distribution for three macro cells using a macro-eNB where each macro cell has four LPNs deployed in each macro cell coverage area and a 6 dB cell association bias is applied to each LPN. Three macro cells can be served by the macro-eNB. For instance, a first macro cell can include LPNs LPNa-d, a second macro cell can include LPNs LPNe-h, and a third macro cell can include LPNs LPNi-k and LPNm. The standard cell coverage area of the LPN can be represented in FIG. 3 by a SINR greater than 5 dB, and the CRE coverage area (e.g., CREa, CREe, or CREm) can be represented by a SINR between −5 and 5 dB when a 6 dB RSRP bias is applied to LPN's RSRP to expand LPN coverage. CREa can represent a CRE coverage area for LPNa, CREe can represent a CRE coverage area for LPNe, CREm can represent a CRE coverage area for LPNm, and so forth.

Both the x-axis and the y-axis of FIG. 3 are measured in meters (m). The SINR can be measured in decibels (dB). A decibel (dB) is a logarithmic unit that indicates the ratio of a physical quantity (usually power or intensity) relative to a specified or implied reference level. A ratio in decibels is ten times the logarithm to base 10 of the ratio of two power quantities. A signal-to-noise-and-interference ratio (SINR) or signal-to-interference ratio (S/I or SIR), also known as the carrier-to-interference ratio (C/I, CIR), refers to the quotient between the average received modulated carrier power S or C and the average received co-channel interference power I, i.e. cross-talk, from other transmitters than the useful signal.

Another technique which can be used to improve the spectrum efficiency in HetNet is coordinated multi-point (CoMP) transmission. Dynamic point selection (DPS) is one kind of CoMP technique. In CoMP techniques, one joint scheduler can schedule multiple neighboring cells within a CoMP cluster. The joint scheduling decision can account for inter-cell interference within the CoMP cluster. Thus, the spectrum efficiency can be improved compared to making scheduling decision for each cell independently.

Figure 4A:
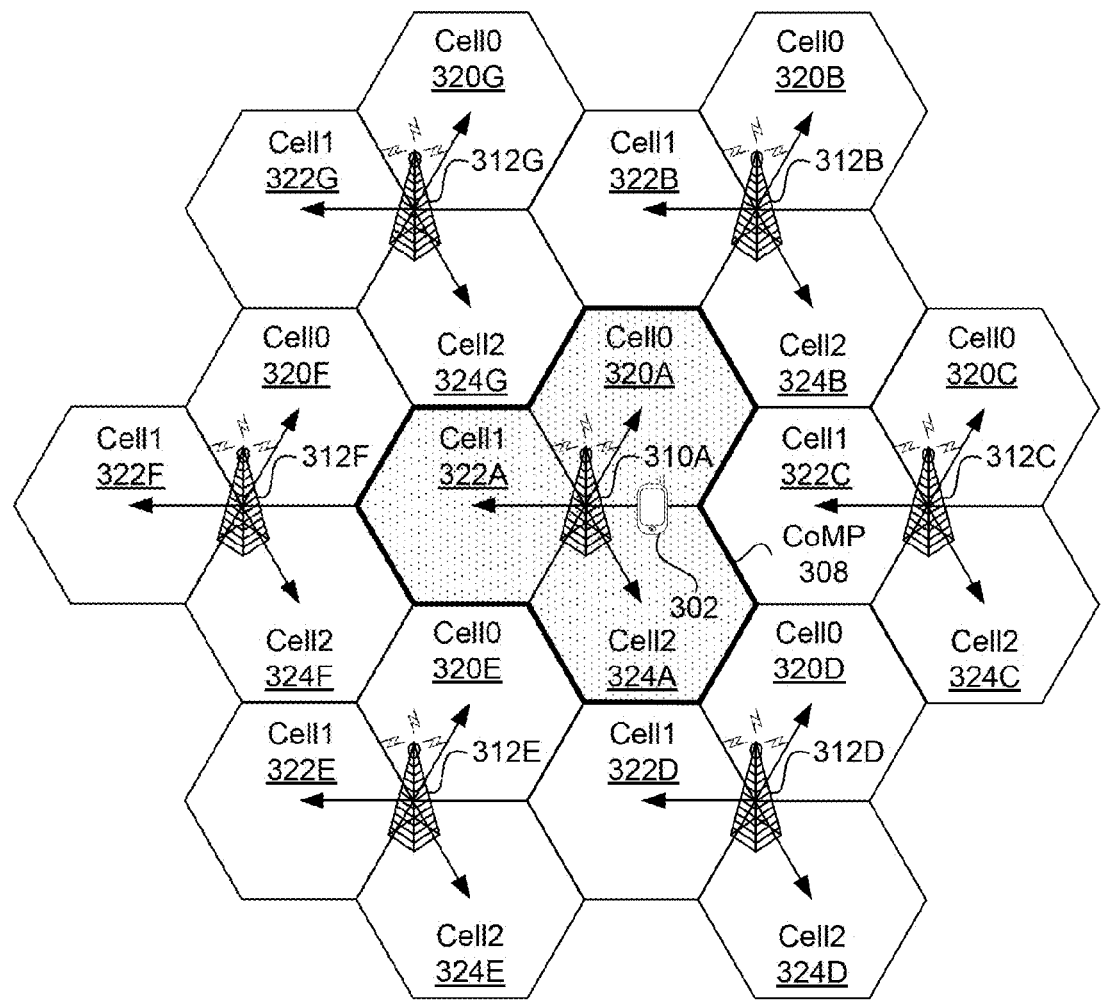
FIG. 4A illustrates a block diagram of a homogenous network using an intra-site coordinated multipoint (CoMP) system (e.g., CoMP scenario 1) in accordance with an example.

FIG. 4A illustrates an example of a coordination area 308 (outlined with a bold line) for a CoMP cluster of an intra-site CoMP system in a homogenous network, which can illustrate LTE CoMP scenario 1. Each node 310A and 312B-G can serve multiple cells (or sectors) 320A-G, 322A-G, and 324A-G. The cell can be a logical definition generated by the node or geographic transmission area or sub-area (within a total coverage area) covered by the node, which can include a specific cell identification (ID) that defines the parameters for the cell, such as control channels, reference signals, and component carriers (CC) frequencies. By coordinating transmission among multiple cells, interference from other cells can be reduced and the received power of the desired signal can be increased. The nodes outside the CoMP system can be non-cooperating nodes 312B-G. In an example, the CoMP system can be illustrated as a plurality of cooperating nodes (not shown) surrounded by a plurality of non-cooperating nodes.

Figure 4B:
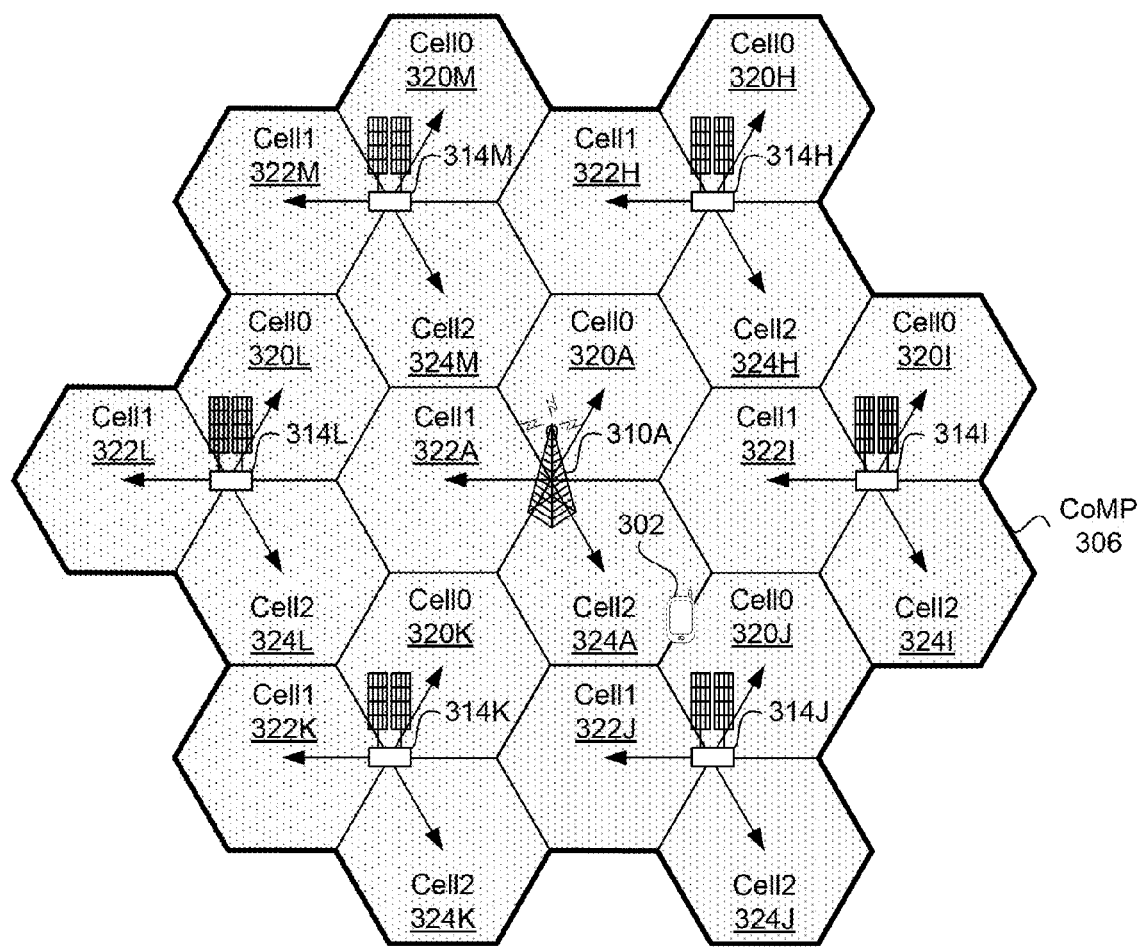
FIG. 4B illustrates a block diagram of a homogenous network with high transmission power using an inter-site coordinated multipoint (CoMP) system (e.g., CoMP scenario 2) in accordance with an example.

FIG. 4B illustrates an example of an inter-site CoMP system with high power remote radio heads (RRHs) in a homogenous network, which can illustrate LTE CoMP scenario 2. A coordination area 306 (outlined with a bold line) can include eNBs 310A and RRHs 314H-M, where each RRH can be configured to communicate with the eNB via a backhaul link (optical or wired link). The cooperating nodes can include eNBs and RRHs. In a CoMP system, the nodes can be grouped together as cooperating nodes in adjacent cells, where the cooperating nodes from multiple cells can transmit signals to the wireless device 302 and receive signals from the wireless device. The cooperating nodes can coordinate transmission/reception of signals from/to the wireless device 302 (e.g., UE). The cooperating node of each CoMP system can be included in a coordinating set or CoMP cluster.

Figure 4C:
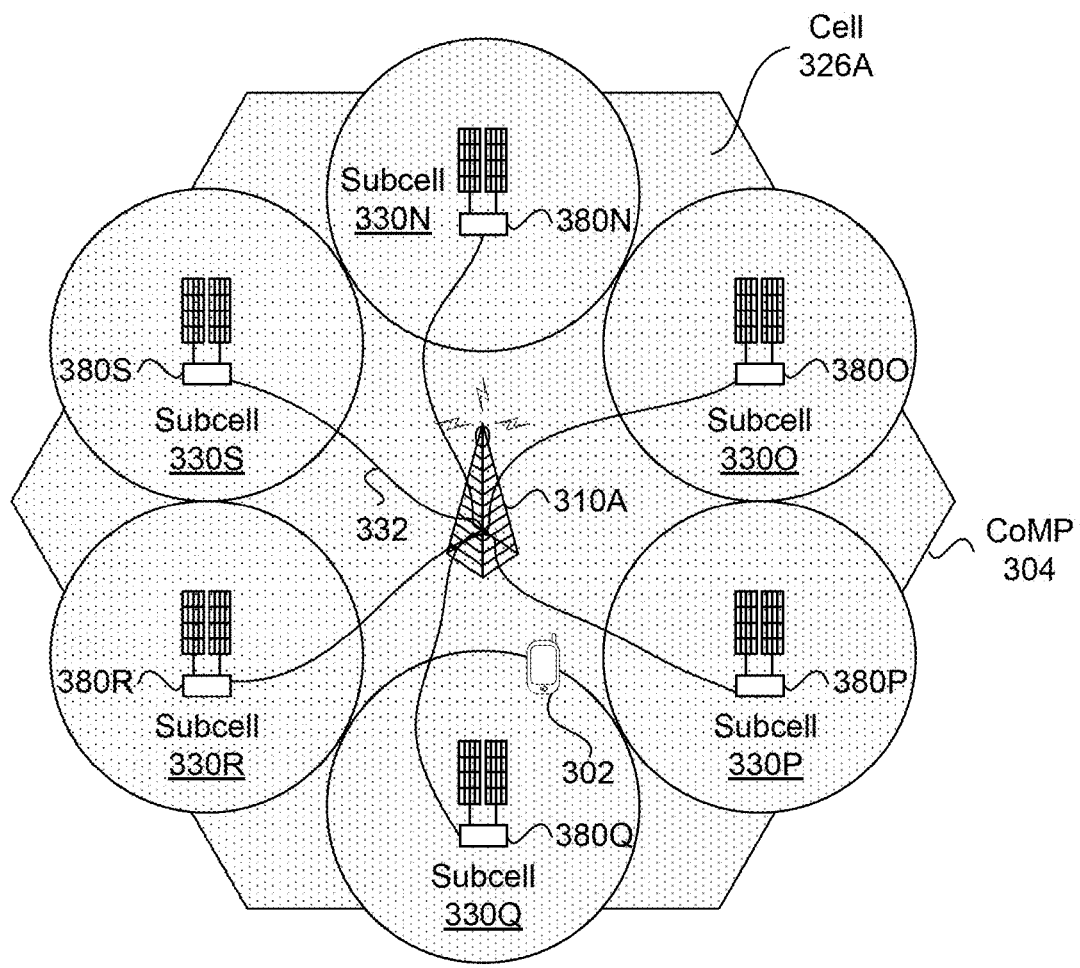
FIG. 4C illustrates a block diagram of a coordinated multipoint (CoMP) system in a heterogeneous network with low power nodes (e.g., CoMP scenario 3 or 4) in accordance with an example.

FIG. 4C illustrates an example of a CoMP system with low power nodes (LPNs) in a macro cell coverage area. FIG. 4C can illustrate LTE CoMP scenarios 3 and 4. In the intra-site CoMP example illustrated in FIG. 4C, LPNs (or RRHs) of a macro node 310A may be located at different locations in space, and CoMP coordination may be within a single macrocell. A coordination area 304 for the CoMP cluster can include eNBs 310A and LPNs 380N-S, where each LPN can be configured to communicate with the eNB via a backhaul link 332 (optical or wired link). A cell 326A of a macro node may be further sub-divided into sub-cells 330N-S. LPNs (or RRHs) 380N-S may transmit and receive signals for a sub-cell. A wireless device 302 can be on a sub-cell edge (or cell-edge) and intra-site CoMP coordination can occur between the LPNs (or RRHs) or between the eNB and the LPNs. In CoMP scenario 3, the low power RRHs providing transmission/reception points within the macrocell coverage area can have different cell IDs from the macro cell. In CoMP scenario 4, the low power RRHs providing transmission/reception points within the macrocell coverage area can have a same cell ID as the macro cell.

A Coordinated MultiPoint (CoMP) system can be used to reduce interference from neighboring nodes in both homogeneous networks (e.g., LTE CoMP scenarios 1 and 2) and HetNets (LTE CoMP scenarios 3 and 4). CoMP operation can apply to downlink transmissions and uplink transmissions. Downlink CoMP operation can be divided into two categories: coordinated scheduling or coordinated beamforming (CS/CB or CS/CBF), and joint processing or joint transmission (JP/JT). With CS/CB, a given subframe can be transmitted from one cell to a given wireless device (e.g., UE), and the scheduling, including coordinated beamforming, is dynamically coordinated between the cells in order to control and/or reduce the interference between different transmissions. For joint processing, joint transmission can be performed by multiple cells to a wireless device (e.g., UE), in which multiple nodes transmit at the same time using the same time and frequency radio resources and/or dynamic cell selection (DCS). Joint processing (JP) can include dynamic point selection (DPS), dynamic point blanking (DPB), or dynamic cell selection (DCS).

Uplink CoMP operation can be divided into two categories: joint reception (JR) and coordinated scheduling and beamforming (CS/CB). With JR, a physical uplink shared channel (PUSCH) transmitted by the wireless device (e.g., UE) can be received jointly at multiple points at a time frame. The set of the multiple points can constitute the CoMP reception point (RP) set, and can be included in part of UL CoMP cooperating set or in an entire UL CoMP cooperating set. JR can be used to improve the received signal quality. In CS/CB, user scheduling and precoding selection decisions can be made with coordination among points corresponding to the UL CoMP cooperating set. With CS/CB, PUSCH transmitted by the UE can be received at one point.

Referring to DL CoMP, the DPS can be used together with dynamic point blanking (DPB) to achieve an offloading effect in a same CoMP cluster, similar to eICIC. In a DPS/DPB case, each joint scheduler can select between two states when making the scheduling decision. A first state can be that only LPNs in the CoMP cluster are transmitting data, and the macro node is muted. A second state can be that both the LPNs and the macro are transmitting data. In an example, the two states can be represented by a single bit for a physical resource (e.g., subframe). Since an offloading effect for CoMP transmission can be more dynamic than eICIC, in an example, the spectrum efficiency can be further improved within the CoMP cluster, especially when the traffic load is dynamic. A CoMP system can provide dynamic offloading of less than 50 milliseconds (ms) (e.g., between 10 ms and 50 ms) and can have a relatively high backhaul traffic load between nodes in the CoMP system (as compared to eICIC). Enhanced ICIC can provide semi-static offloading of greater than 500 ms (e.g., 640 ms) and can have a low backhaul traffic load (as compared to the CoMP system).

In an example, a DPS/DPB used in CoMP transmission can operate less efficiently (compared with eICIC) due to an offloading effect or edge effect. For example, DPS/DPB may offload dynamically between macro nodes and LPNs within a CoMP cluster, but DPS/DPB in which no CRE is applied to the LPNs when UE is doing cell association may not offload between a macro and an LPN of two neighboring CoMP clusters without severe interference from neighboring CoMP clusters, which can be referred to as the offloading effect or edge effect. In this example, the offloading (or offloading effect) may only be possible within one CoMP cluster. The edge effect can affect the UEs on the edge of a CoMP cluster neighboring other CoMP clusters. In an example, the edge effect without CRE between neighboring CoMP clusters can downgrade the DPS/DPB performance and cause the CoMP system spectrum efficiency (SE) to be worse than eICIC.

To maintain an advantage achieved by dynamic offloading within CoMP cluster over eICIC without suffering from an edge effect caused by CoMP clustering, various techniques can be used, such as CRE between neighboring CoMP clusters and coordinating a muting preference.

For example, cell range expansion can be used before determining the UEs and/or nodes in the CoMP cluster. For instance, a UE can first select one serving cell from the macro and LPNs, where the coverage of the LPNs is expanded by a cell range expansion bias (e.g., 9 dB for a RSRP). CRE before assigning UEs to a CoMP cluster can avoid or mitigate the edge effect. In another example, a LPN in a first CoMP cluster can offload traffic from a macro belonging to a neighboring CoMP cluster (e.g., second CoMP cluster). The CRE for CoMP can be configured semi-statically.

During scheduling of CoMP transmission (e.g., DPS), each joint scheduler used by each CoMP cluster can make resource allocations for the UEs attached to the cells belonging to the CoMP cluster. In an example, a macro node can include the joint scheduler. If a UE is offloaded from a macro in first CoMP cluster to a LPN in a neighboring CoMP cluster (e.g., second CoMP cluster), the UE can be scheduled by the neighboring CoMP cluster instead of the first CoMP cluster, which originally served the UE (via the macro node of the first CoMP cluster) without the CRE.

Since scheduling decision of each CoMP cluster can be made independently by the CoMP cluster's joint scheduler, a pico UE (i.e., a UE in a pico cell) can experience harsh interference from a neighboring CoMP cluster's macro cell. Coordinating the DPB resources over a backhaul link, such as X2 interface, between two CoMP clusters can be used to mitigate the interference from the neighboring CoMP cluster's macro cell. The coordination of the DPB resources can align at least some of the blanked resources for macro cells, so the pico UEs that are offloaded from a first CoMP cluster to a second CoMP cluster may not experience harsh interference from the neighbor CoMP cluster's macro cell. The coordination of the DPB resources can include sending (e.g., transmitting), receiving, or exchanging a muting preference. The muting preference includes a resource map, where the resource map includes a bit array, a bitmap, a bitset, a bitstring, a data array, a list, a string, or a table, where each element of the resource map can represent a blanked or muted resource, (e.g., subframe). In an example, a first CoMP cluster can transmit the muting preference to the second CoMP cluster, and the second CoMP cluster can move the blanked resources for second CoMP cluster to match or align at least one blank resource with the muting preference of the first CoMP cluster. The macro node of the first CoMP cluster can operate as a master macro node relative to the muting preference, and the macro node of the second CoMP cluster can operate as a slave macro node relative to the muting preference, which can adjust based on the muting preference of the master macro node.

Figure 5:
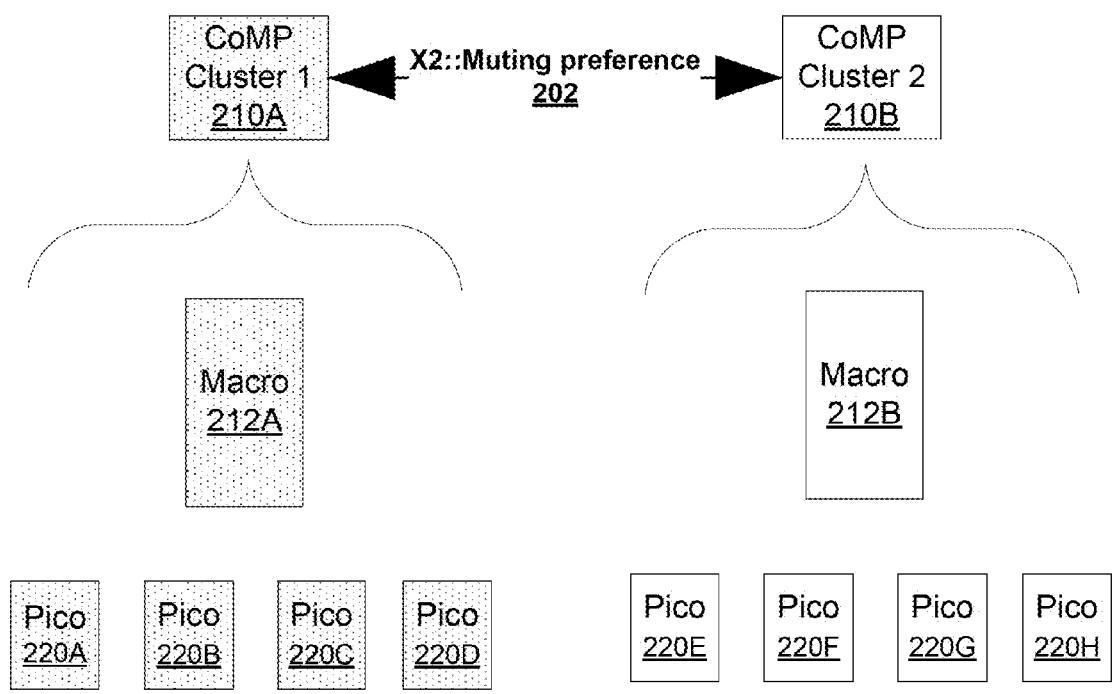
FIG. 5 illustrates a diagram of two Coordinated MultiPoint (CoMP) clusters coordinating a muting preference over an X2 interface in accordance with an example.

FIG. 5 illustrates the transmission of the muting preference 202 between two CoMP clusters (e.g., CoMP cluster 1 210A and CoMP cluster 2 210B). Each CoMP cluster can include a macro node 212A-B and four LPNs (e.g., pico nodes 220A-H) and can be scheduled by one joint scheduler. The two macro cells can coordinate the muting preference over X2 interface between two macro cells. In the time domain, the muting preference can have a one subframe granularity, in an example. For example, both macro cells can indicate to a neighboring macro cell that the preferred muting subframes (e.g., subframes 0, 1, 2, and 3) with a 8 ms periodicity. The muting preference can indicate the blanked resources and the periodicity of the muting preference.

In the frequency domain, the muting preference can have one resource block group (RBG) granularity. An RBG can be a set of consecutive PRBs in frequency. The RBG size P can be a function of the downlink system bandwidth $N_{RB}^{DL}$. The RBG size P can be the number of physical resource blocks (PRBs) within a RBG. In an example, the total number of RBGs $N_{RBG}$ for downlink system bandwidth of $N_{RB}^{DL}$ is given by $N_{RBG}=\lceil N_{RB}^{DL}/P\rceil$. For a downlink system bandwidth of 10 PRBs or less (e.g., 1.4 MHz) the RBG size P can be one PRB per RBG. For a downlink system bandwidth of 11-26 PRBs (e.g., 3 or 5 MHz) the RBG size P can be two PRBs per RBG. For a downlink system bandwidth of 27-63 PRBs (e.g., 10 MHz) the RBG size P can be three PRBs per group. For a downlink system bandwidth of 64-110 PRBs (e.g., 15 or 20 MHz) the RBG size P can be four PRBs per RBG.

In an example, the muting preference signaling can be included in an X2 application protocol, such as LTE 3GPP Technical Specification (TS) 36.423 V11.2.0 (2012-09).

Compared with a conventional eICIC scheme, the CoMP system using a muting preference for inter-CoMP cluster coordination can have a CoMP joint scheduling gain within a CoMP cluster without suffering from the edge effect between two neighboring CoMP clusters. In addition, offloading using CRE can be used to offload a UE from LPN (e.g., pico node or pico cell) in a first CoMP cluster to a macro node in a neighboring CoMP cluster (e.g., second CoMP cluster). In an example of CRE, the UE can select a cell with a highest biased RSRP and the UE can be scheduled by a CoMP cluster which includes highest biased RSRP for the UE. The uncoordinated inter-CoMP cluster interference can be mitigated via a relatively slow X2 interface through exchanging muting preference (e.g. once every second). In an example, the muting preference can be transmitted, received, or exchanged in a range between 500 ms and 10 seconds, which can reduce traffic loading of a backhaul link while maintaining a high spectral efficiency (SE) and a high scheduling gain.

Figure 6:
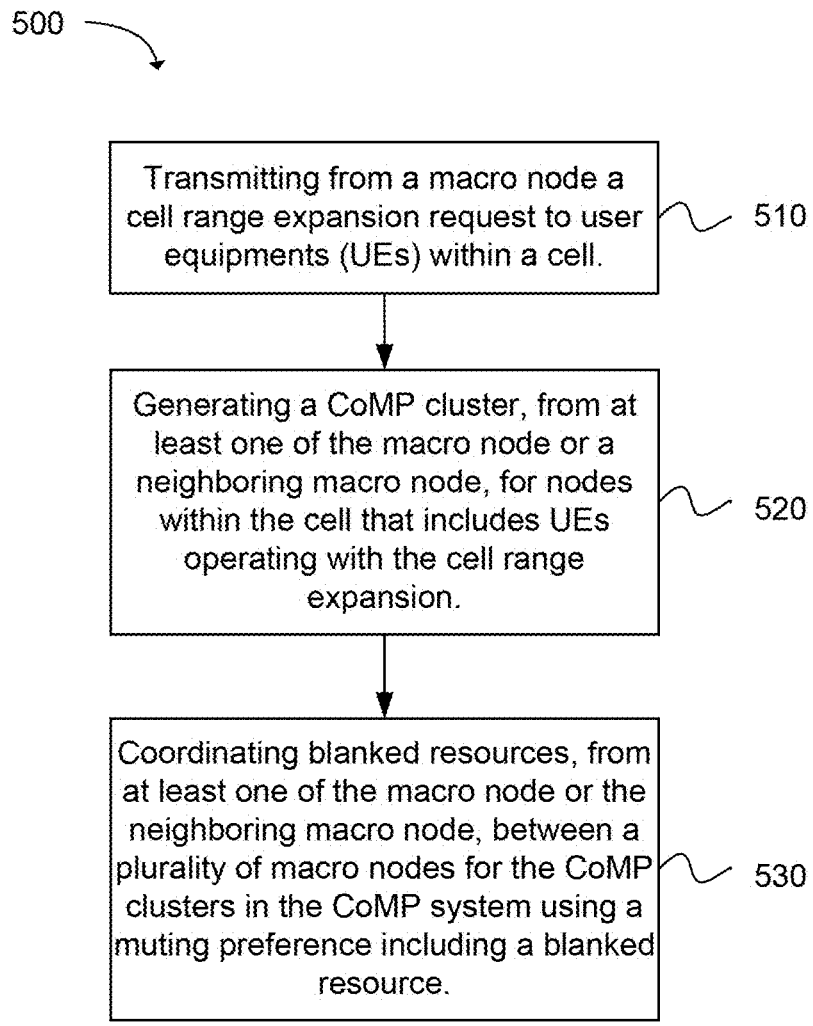
FIG. 6 depicts a flow chart of a method for mitigating edge effect interference in a Coordinated MultiPoint (CoMP) system having multiple CoMP clusters in accordance with an example.

Another example provides a method 500 for mitigating edge effect interference in a Coordinated MultiPoint (CoMP) system having multiple CoMP clusters, as shown in the flow chart in FIG. 6. The method may be executed as instructions on a machine or computer circuitry, where the instructions are included on at least one computer readable medium or one non-transitory machine readable storage medium. The method includes the operation of transmitting from a macro node a cell range expansion request to user equipments (UEs) within a cell, as in block 510. The operation of generating a CoMP cluster, from at least one of the macro node or a neighboring macro node, for nodes within the cell that includes UEs operating with the cell range expansion follows, as in block 520. The next operation of the method can be coordinating blanked resources, from at least one of the macro node or the neighboring macro node, between a plurality of macro nodes for the CoMP clusters in the CoMP system using a muting preference including a blanked resource, as in block 530.

The operation of transmitting the cell range expansion request can further include: Sending the cell range expansion request for a UE to apply a cell range expansion bias, wherein the UE is adjacent to a receptor cell low power node (LPN) in a neighboring cell; and coordinating, at the macro node, an handover of the UE from macro node to the receptor cell LPN based on the cell range expansion applied by the UE. In an example, the cell range expansion bias can uses a specified reference signal (RS) biasing having a range greater than 0 decibel (dB) to about 16 dB. The UE can measure an LPN RS to generate an LPN RS measurement including a reference signal received power (RSRP) or a reference signal received quality (RSRQ).

In another example, the operation of coordinating the blanked resources can further include sending, from the macro node to a neighboring macro node in a neighboring CoMP cluster, a muting preference including the blanked resource of the macro node. The muting preference enables the neighboring macro node to reschedule the blanked resource for the neighboring CoMP cluster based on the muting preference of the macro node, which can align the blanked resource of the neighboring CoMP cluster to the CoMP cluster including the macro node. The alignment of the blanked resource enables the blanked resource to have a same frequency-domain index and a same time-domain index for both the neighboring CoMP cluster and the CoMP cluster.

In another configuration, the operation of coordinating the blanked resources can further include: Receiving, at the macro node from a neighboring macro node in a neighboring CoMP cluster, a muting preference including the blanked resource for the neighboring macro node; and rescheduling the blanked resource at the macro node based on the muting preference of the neighboring macro node of a neighboring CoMP cluster, which can align the blanked resource of the CoMP cluster including the macro node to the neighboring CoMP cluster. The blanked resource can have a one subframe granularity in a time domain or a one resource block group (RBG) granularity in a frequency domain.

The operation of coordinating the blanked resources can use X2 signaling or backhaul link signaling via a wired connection, a wireless connection, or an optical fiber connection. The operation of coordinating the blanked resources can use one bit to represent one subframe where the one bit indicates each blanked resource or transmission resource for the subframe. In another example, the muting preference includes a resource map, where the resource map includes a bit array, a bitmap, a bitset, a bitstring, a data array, a list, a string, or a table. The muting preference can be transmitted with a periodicity of at least 500 milliseconds (ms), such as 640 ms.

In an example, the method can further include scheduling resources for data transmission for a low power node (LPN) with the macro node muted or for both the LPN and the macro node using dynamic point selection (DPS) or dynamic point blanking (DPB). The nodes in the cell can include a base station (BS), a Node B (NB), an evolved Node B (eNB), a baseband unit (BBU), a remote radio head (RRH), a remote radio equipment (RRE), or a remote radio unit (RRU).

Figure 7:
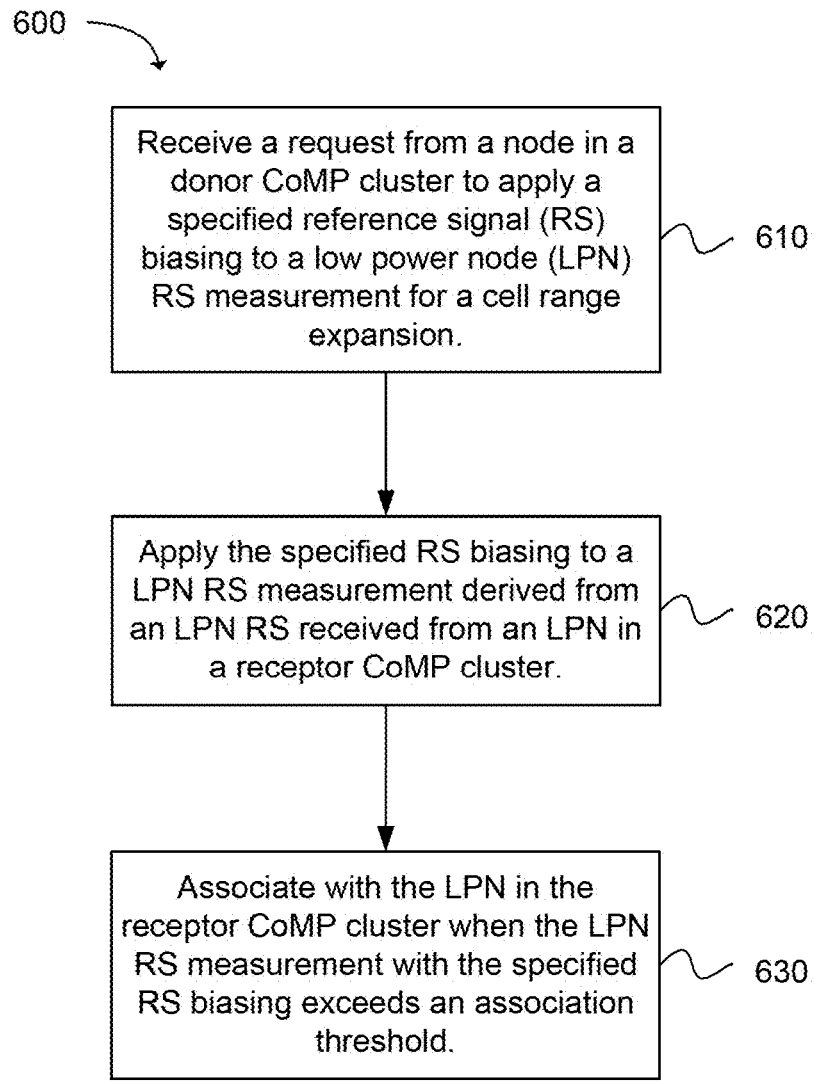
FIG. 7 depicts a flow chart of a method for inter-Coordinated MultiPoint (CoMP) system cell range expansion in a heterogeneous network (HetNet) in accordance with an example.

Another example provides a method 600 for inter-Coordinated MultiPoint (CoMP) system cell range expansion in a heterogeneous network (HetNet), as shown in the flow chart in FIG. 7. The method may be executed as instructions on a machine or computer circuitry, where the instructions are included on at least one computer readable medium or one non-transitory machine readable storage medium. A user equipment (UE) operable for inter-Coordinated MultiPoint (CoMP) system cell range expansion in a heterogeneous network (HetNet) can have computer circuitry to perform the method 600. The computer circuitry can be configured to receive a request from a node in a donor CoMP cluster to apply a specified reference signal (RS) biasing to a low power node (LPN) RS measurement for a cell range expansion, as in block 610. The computer circuitry can be further configured to apply the specified RS biasing to a LPN RS measurement derived from an LPN RS received from an LPN in a receptor CoMP cluster, as in block 620. The computer circuitry can also be configured to associate with the LPN in the receptor CoMP cluster when the LPN RS measurement with the specified RS biasing exceeds an association threshold, as in block 630.

In an example, the computer circuitry can be further configured to communicate with the LPN in the receptor CoMP cluster during a muted transmission of a macro node in the donor CoMP cluster. The muted transmission of the macro node in the donor CoMP cluster can align with a muted transmission of a macro node in the receptor CoMP cluster based on a muting preference of one of the macro node in the donor CoMP cluster and the macro node in the receptor CoMP cluster transmitted to the other of the receptor CoMP cluster and the donor CoMP cluster. For example, the muting preference can be transmitted from the macro node in the donor CoMP cluster to the macro node in the receptor CoMP cluster or the muting preference can be transmitted from the macro node in the receptor CoMP cluster to the macro node in the donor CoMP cluster. The muted transmission can include at least one subframe transmission in a time domain or at least one resource block group (RBG) transmission in a frequency domain.

The LPN RS measurement can include a measurement including a reference signal received power (RSRP) or a reference signal received quality (RSRQ). The specified RS biasing can have a range greater than 0 decibel (dB) to about 16 dB. In an example, the computer circuitry configured to associate with the LPN in the receptor CoMP cluster can be further configured to associate with the LPN in the receptor CoMP cluster when the LPN RS measurement with the specified RS biasing exceeds a donor CoMP cluster macro node RS measurement by a predetermined amount.

In another example, the computer circuitry configured to associate with the LPN in the receptor CoMP cluster can be further configured to send a re-association request to the node in the donor CoMP cluster requesting a handover to the LPN in the receptor CoMP cluster. The re-association request can instruct a macro node in the donor CoMP cluster to offload communication with the UE to the LPN in the receptor CoMP cluster.

Figure 8:
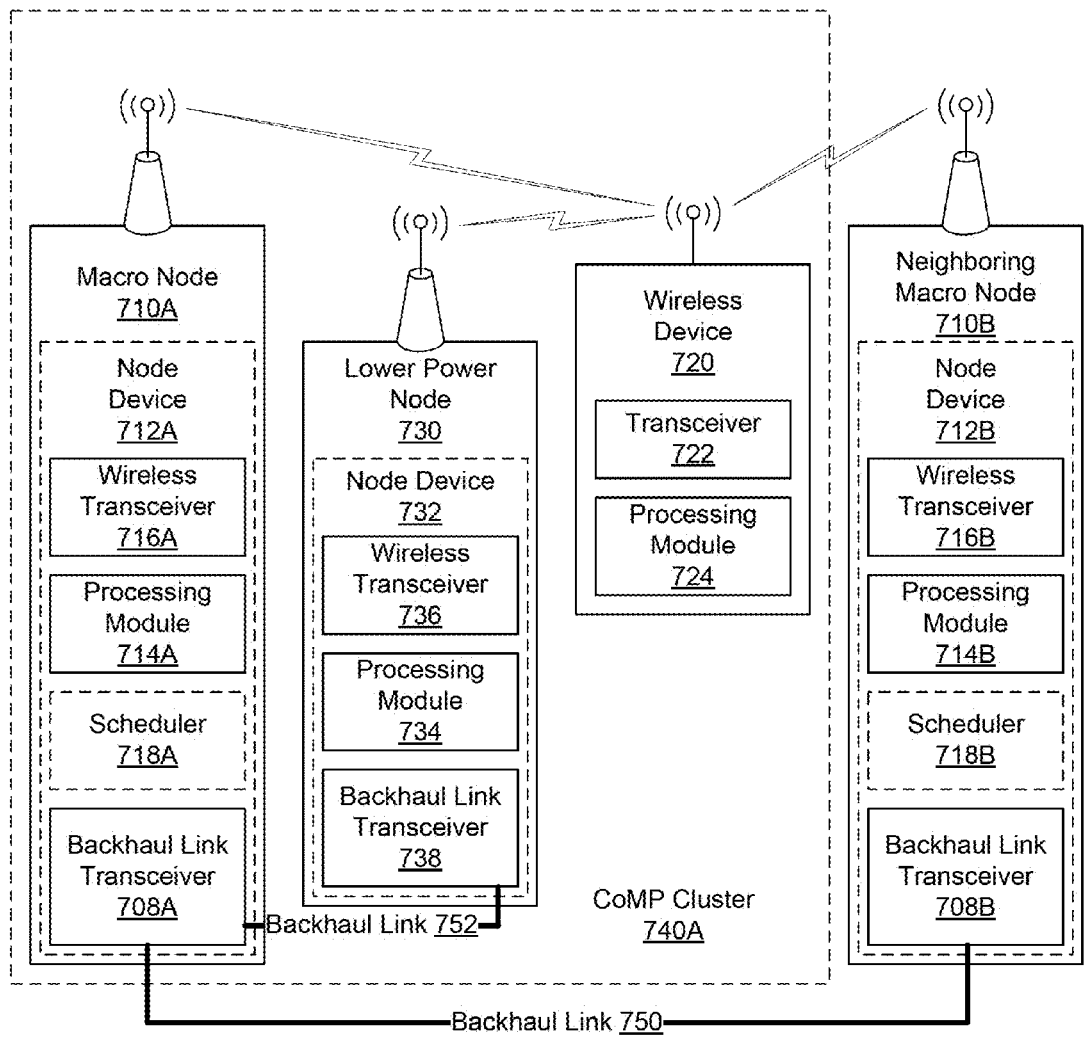
FIG. 8 illustrates a block diagram of a local macro node, a low power node (LPN), a wireless device, and a neighboring macro node in accordance with an example.

FIG. 8 illustrates example nodes and an example wireless device 720 (e.g., UE) in a heterogeneous network (HetNet). The nodes can include a base station (BS), a Node B (NB), an evolved Node B (eNB), a macro node, a low power node (LPN), a baseband unit (BBU), a remote radio head (RRH), a remote radio equipment (RRE), a remote radio unit (RRU), or a central processing module (CPM). The nodes can include a macro node (e.g., macro-eNB) or a low power node 730 (e.g., a micro-eNB, a pico-eNB, a femto-eNB, or a home eNB [HeNB0, RRH, RRE, or RRU]. The macro nodes can include a macro node 710A (e.g., local macro node) and a neighboring macro node 710B. The macro node can be included in a Coordinated MultiPoint (CoMP) cluster including at least one low power node (LPN). The neighboring macro node can be included in a neighboring CoMP cluster including at least one LPN (not shown).

Each node 710A-B and 730 can include a node device 712A-B and 732 (e.g., coordinating device). The coordinating device, node device, or the node can be configured to communicate with the wireless device. The coordinating device or node device can be configured for offloading a user equipment (UE) from a Coordinated MultiPoint (CoMP) cluster to a neighboring CoMP cluster. The coordinating device, node device, or the node can be configured to communicate with other nodes via a backhaul link 750 and 752 (a wired connection, a wireless connection, or an optical fiber connection), such as an X2 application protocol (X2AP) or X2 signaling.

Each node device 712A-B and 732 (e.g., coordinating device) can include a backhaul link transceiver 708A-B and 738, a scheduler 718A-B (e.g., joint scheduler), a wireless transceiver 716A-B and 736, and a processor or processing module 714A-B and 734. A transceiver module can include the backhaul link transceiver and the wireless transceiver. The backhaul link transceiver 708A-B can be configured to communicate a muting preference via a backhaul link 750 with a neighboring macro node 710B within a neighboring CoMP cluster different from a CoMP cluster 740A. The muting preference can include a blanked resource for physical resources of the macro node or the neighboring macro node.

The transceiver module (e.g., wireless transceiver 716A-B and 736) of the node device 712A-B and 732 can be configured to: Request a UE to use a cell range expansion bias, and receive a re-association request from the UE for the UE to associate with a low power node (LPN) in the neighboring CoMP cluster and offload traffic from the node. The transceiver module (e.g., backhaul link transceiver 708A-B and 738) can be configured to transmit a muting preference including a scheduled blanked resource for the node to a neighboring macro node in the neighboring CoMP cluster to enable the neighboring macro node to align the blanked resource of the neighboring CoMP cluster to the CoMP cluster including the node.

In an example, the transceiver module (e.g., backhaul link transceiver 708A-B and 738) can be further configured to receive, from a neighboring macro node in the neighboring CoMP cluster, a muting preference including a scheduled blanked resource for the neighboring macro node. The processing module 714A-B and 734 can be configured to reschedule the blanked resource at the node based on the muting preference of the neighboring macro node to align the scheduled blanked resource of the CoMP cluster including the node to the neighboring macro node. The blanked resources or the scheduled blanked resource can include at least one subframe in a time domain or at least one resource block group (RBG) in a frequency domain.

In another example, the transceiver module (e.g., backhaul link transceiver 708A-B and 738) can be configured to receive the muting preference of blanked resources from the neighboring macro node using X2 signaling or backhaul link signaling via a wired connection, a wireless connection, or an optical fiber connection. The blanked resource can include a radio subframe, a slot, a frequency carrier, a frequency subcarrier, or a physical resource block (PRB).

In another configuration, the processing module 714A-B and 734 can be configured to: Generate the CoMP cluster to include a neighboring UE formerly in the neighboring CoMP cluster, where the neighboring UE is associated with the node or the CoMP cluster due to cell range expansion; and apply dynamic point selection (DPS) or dynamic point blanking (DPB) in scheduling resources for the neighboring UE. In another example, the scheduler 718A-B can be configured to apply DPS or DPB in scheduling resources for the neighboring UE. The processing module can be configured to apply an enhanced inter-cell interference coordination (eICIC) in the time domain for semi-statically scheduling resources for the UE.

The transceiver module (e.g., wireless transceiver 712A and 712B) can be configured to communicate with a wireless device and receive a reference signal (RS) measurement from the wireless device. The wireless device 720 (e.g., UE) can be in communication with the macro node 710A, neighboring macro node 710B, or the LPN 730 and/or receive interference from the neighboring macro node 710B. The wireless device can include a transceiver 722 and a processing module 724. The transceiver of the wireless device can be configured to receive DL transmission information from the nodes and transmit UL transmission information to the nodes. The processing module can measure an LPN reference signal (RS) measurement and apply a specified RS biasing to the LPN RS measurement for a cell range expansion. The UL transmission information can include a RS measurement including a RSRP or a RSRQ.

Figure 9:
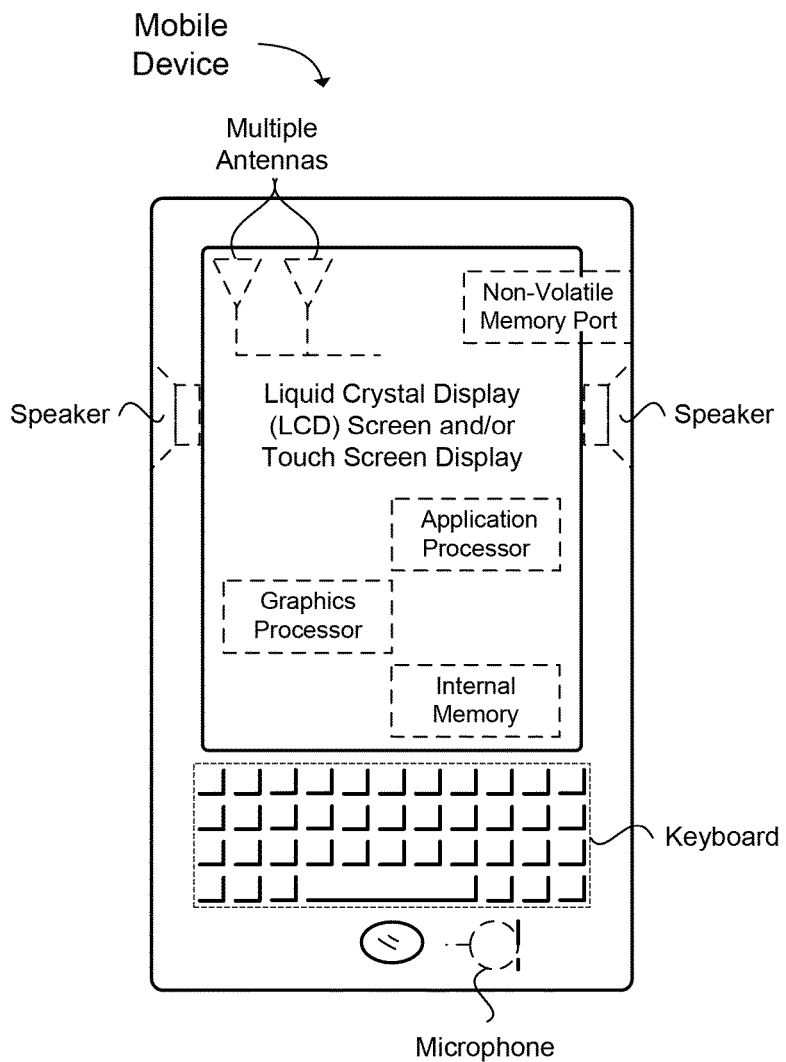
FIG. 9 illustrates a diagram of a wireless device in accordance with an example.

FIG. 9 provides an example illustration of the wireless device, such as an user equipment (UE), a mobile station (MS), a mobile wireless device, a mobile communication device, a tablet, a handset, or other type of mobile wireless device. The wireless device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for mitigating edge effect interference in a Coordinated MultiPoint (CoMP) system having multiple CoMP clusters, comprising:
    transmitting from a macro node a cell range expansion request to user equipments (UEs) within a cell to enable the UEs to apply a cell range expansion bias;
    generating a CoMP cluster, from at least one of the macro node or a neighboring macro node, for nodes within the cell to include the UEs operating with the cell range expansion bias; and
    coordinating blanked resources, from at least one of the macro node or the neighboring macro node, between a plurality of macro nodes for the CoMP clusters in the CoMP system using a muting preference including a blanked resource.

2. The method of claim 1, wherein transmitting the cell range expansion request further comprises:
    sending the cell range expansion request for the UE to apply the cell range expansion bias, wherein the UE is adjacent to a receptor cell low power node (LPN) in a neighboring cell; and
    coordinating, at the macro node, an handover of the UE from macro node to the receptor cell LPN based on the cell range expansion applied by the UE.

3. The method of claim 2, wherein the cell range expansion bias uses a specified reference signal (RS) biasing having a range greater than 0 decibel (dB) to about 16 dB; and the UE measures an LPN RS to generate an LPN RS measurement selected from the group consisting of a reference signal received power (RSRP), a reference signal received quality (RSRQ), and combinations thereof.

4. The method of claim 1, wherein coordinating the blanked resources further comprises:
    sending, from the macro node to a neighboring macro node in a neighboring CoMP cluster, a muting preference including the blanked resource of the macro node, to enable the neighboring macro node to reschedule the blanked resource for the neighboring CoMP cluster based on the muting preference of the macro node to align the blanked resource of the neighboring CoMP cluster to the CoMP cluster including the macro node, to enable the blanked resource to have a same frequency-domain index and a same time-domain index for both the neighboring CoMP cluster and the CoMP cluster.

5. The method of claim 1, wherein coordinating the blanked resources further comprises:
    receiving, at the macro node from a neighboring macro node in a neighboring CoMP cluster, a muting preference including the blanked resource for the neighboring macro node; and
    rescheduling the blanked resource at the macro node based on the muting preference of the neighboring macro node of a neighboring CoMP cluster to align the blanked resource of the CoMP cluster including the macro node to the neighboring CoMP cluster.

6. The method of claim 1, wherein the blanked resource has a one subframe granularity in a time domain or a one resource block group (RBG) granularity in a frequency domain.

7. The method of claim 1, wherein coordinating the blanked resources uses X2 signaling or backhaul link signaling via a wired connection, a wireless connection, or an optical fiber connection.

8. The method of claim 1, wherein coordinating the blanked resources uses one bit to represent one subframe where the one bit indicates each blanked resource or transmission resource for the subframe; and the muting preference includes a resource map selected from the group consisting of a bit array, a bitmap, a bitset, a bitstring, a data array, a list, a string, a table, and combinations thereof; and the muting preference is transmitted with a periodicity of at least 500 milliseconds.

9. The method of claim 1, further comprising:
    scheduling resources for data transmission for a low power node (LPN) with the macro node muted or for both the LPN and the macro node using dynamic point selection (DPS) and dynamic point blanking (DPB).

10. The method of claim 1, wherein the nodes in the cell are selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

11. At least one non-transitory machine readable storage medium comprising a plurality of instructions adapted to be executed to implement the method of claim 1.

12. A coordinating device of a node configured for offloading a user equipment (UE) from a Coordinated MultiPoint (CoMP) cluster to a neighboring CoMP cluster, comprising:
    a transceiver module to:
        send a cell range expansion request to a UE that requests the UE to use a cell range expansion bias;
        receive a re-association request from the UE for the UE to associate with a low power node (LPN) in the neighboring CoMP cluster and offload traffic from the node; and
        transmit a muting preference including a scheduled blanked resource for the node to a neighboring macro node in the neighboring CoMP cluster to enable the neighboring macro node to align the blanked resource of the neighboring CoMP cluster to the CoMP cluster including the node.

13. The coordinating device of claim 12, wherein the transceiver module is further configured to:

receive, from a neighboring macro node in the neighboring CoMP cluster, a muting preference including a scheduled blanked resource for the neighboring macro node; and the coordinating device further comprises:

a processing module to:

reschedule the blanked resource at the node based on the muting preference of the neighboring macro node to align the scheduled blanked resource of the CoMP cluster including the node to the neighboring macro node.

14. The coordinating device of claim 13, wherein the blanked resources includes at least one subframe in a time domain or at least one resource block group (RBG) in a frequency domain.

15. The coordinating device of claim 13, wherein the transceiver module is configured to receive the muting preference of blanked resources from the neighboring macro node using X2 signaling or backhaul link signaling via a wired connection, a wireless connection, or an optical fiber connection; and the blanked resource is selected from the group consisting of a radio subframe, a slot, a frequency carrier, a frequency subcarrier, a physical resource block (PRB), and combinations thereof.

16. The coordinating device of claim 12, further comprising:

a processing module to:

generate the CoMP cluster to include a neighboring UE formerly in the neighboring CoMP cluster, wherein the neighboring UE is associated with the node or the CoMP cluster due to cell range expansion, and apply dynamic point selection (DPS) or dynamic point blanking (DPB) in scheduling resources for the neighboring UE.

17. The coordinating device of claim 12, further comprising:

a processing module to:

apply an enhanced inter-cell interference coordination (eICIC) in the time domain for semi-statically scheduling resources for the UE.

18. The wireless device of claim 12, wherein the node is selected from the group consisting of a base station (BS), a Node B (NB), an evolved Node B (eNB), a macro node, a low power node (LPN), a baseband unit (BBU), a remote radio head (RRH), a remote radio equipment (RRE), a remote radio unit (RRU), a central processing module (CPM), and combinations thereof; the macro node includes a macro evolved Node B (macro-eNB) and the LPN includes a micro-eNB, a pico-eNB, a femto-eNB, a home eNB (HeNB), RRH, RRE, or RRU; and the wireless device is selected from the group consisting of a user equipment (UE) and a mobile station (MS), and the wireless device includes at least one of an antenna, a touch sensitive display screen, a speaker, a microphone, a graphics processor, an application processor, internal memory, a non-volatile memory port, and combinations thereof.

* * * * *